United States Patent
Rissmeyer et al.

(10) Patent No.: US 6,857,069 B1
(45) Date of Patent: Feb. 15, 2005

(54) MODIFIED OPERATING SYSTEM BOOT SEQUENCE FOR ISCSI DEVICE SUPPORT

(75) Inventors: Charles Steven Rissmeyer, Coon Rapids, MN (US); Edward Alan Soltis, Elk River, MN (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 10/395,292

(22) Filed: Mar. 24, 2003

(51) Int. Cl.⁷ .......................................... G06F 15/177
(52) U.S. Cl. ............................................. 713/2; 713/1
(58) Field of Search ................................. 713/1, 2

(56) References Cited

U.S. PATENT DOCUMENTS 6,317,826 B1 * 11/2001 McCall et al. ................. 713/1
6,330,669 B1 * 12/2001 McKeeth ........................ 713/1
6,601,166 B1 * 7/2003 Ayyar et al. ................... 713/2
6,671,820 B1 * 12/2003 Kelman ......................... 714/4
6,728,875 B1 * 4/2004 Aguilar et al. ................. 713/2
6,748,525 B1 * 6/2004 Hubacher et al. ............. 713/1
6,795,912 B1 * 9/2004 Itoh et al. ...................... 713/2

* cited by examiner

Primary Examiner—Jeffrey Gaffin
Assistant Examiner—Harold Kim
(74) Attorney, Agent, or Firm—Schwegman, Lundberg, Woessner & Kluth, P.A.

(57) ABSTRACT

SCSI commands are transported over the TCP/IP connection to provide access to a bootable operating system stored on a second networked computerized system, and the networked computerized system is booted from the bootable operating system stored on the second networked computerized system via the SCSI commands transported over the TCP/IP connection. A network driver is loaded in the booting operating system before the booting operating system's disk driver is loaded.

19 Claims, 2 Drawing Sheets

MODIFIED OPERATING SYSTEM BOOT SEQUENCE FOR ISCSI DEVICE SUPPORT

FIELD OF THE INVENTION

The invention relates generally to booting computers, and more specifically to a system and method for booting a computer using iSCSI involving loading a network driver of a booting operating system before loading a disk driver

BACKGROUND OF THE INVENTION

Computers traditionally use built-in code known as a BIOS (Basic Input/Output System) to perform initial boot functions and to control certain attached devices before loading an operating system or other software. This enables a computer to receive input from a keyboard and to output data to a display, and further provides the computer with control of devices such as serial communications ports and disk drives.

When booting, a personal computer typically either executes the BIOS from ROM or flash memory, or loads the BIOS into RAM and executes the BIOS code from RAM to perform initial testing, configuration, and to initialize loading an operating system. Although operating systems are traditionally loaded from had disks or diskette drives, BIOS extensions such as the PXE or Preboot eXecution Environment provide a computer system the ability to establish a network connection before loading an operating system, and to boot over the network connection via a network bootstrap program. Various other BIOS extensions provide the ability to boot via USB or other devices, but typically require a specially configured bios extension or system BIOS to implement.

The various diskless boot options discussed here require a computer system to have a specialized network interface card or a customized system BIOS, and so may be somewhat difficult to implement in existing systems or with many off-the-shelf parts. In many operating systems the boot disks are assumed to be locally attached storage devices, thus the operating system disk drivers are started first. Later in the operating system startup sequence the network drivers are executed. A boot option enabling a computer system having neither a custom network interface card nor a custom system BIOS is therefore desirable.

SUMMARY OF THE INVENTION

The present invention provides in one embodiment a system and method of loading a network driver before loading a disk driver in an operating system booting over a network via iSCSI. This facilitates operation of iSCSI devices, ensuring that the network interface is available for use when the iSCSI disk driver is loaded. SCSI commands are transported over the TCP/IP connection to provide access to the bootable operating system stored on a second networked computerized system, and the networked computerized system is booted from the bootable operating system stored on the second networked computerized system via the SCSI commands transported over the TCP/IP connection.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
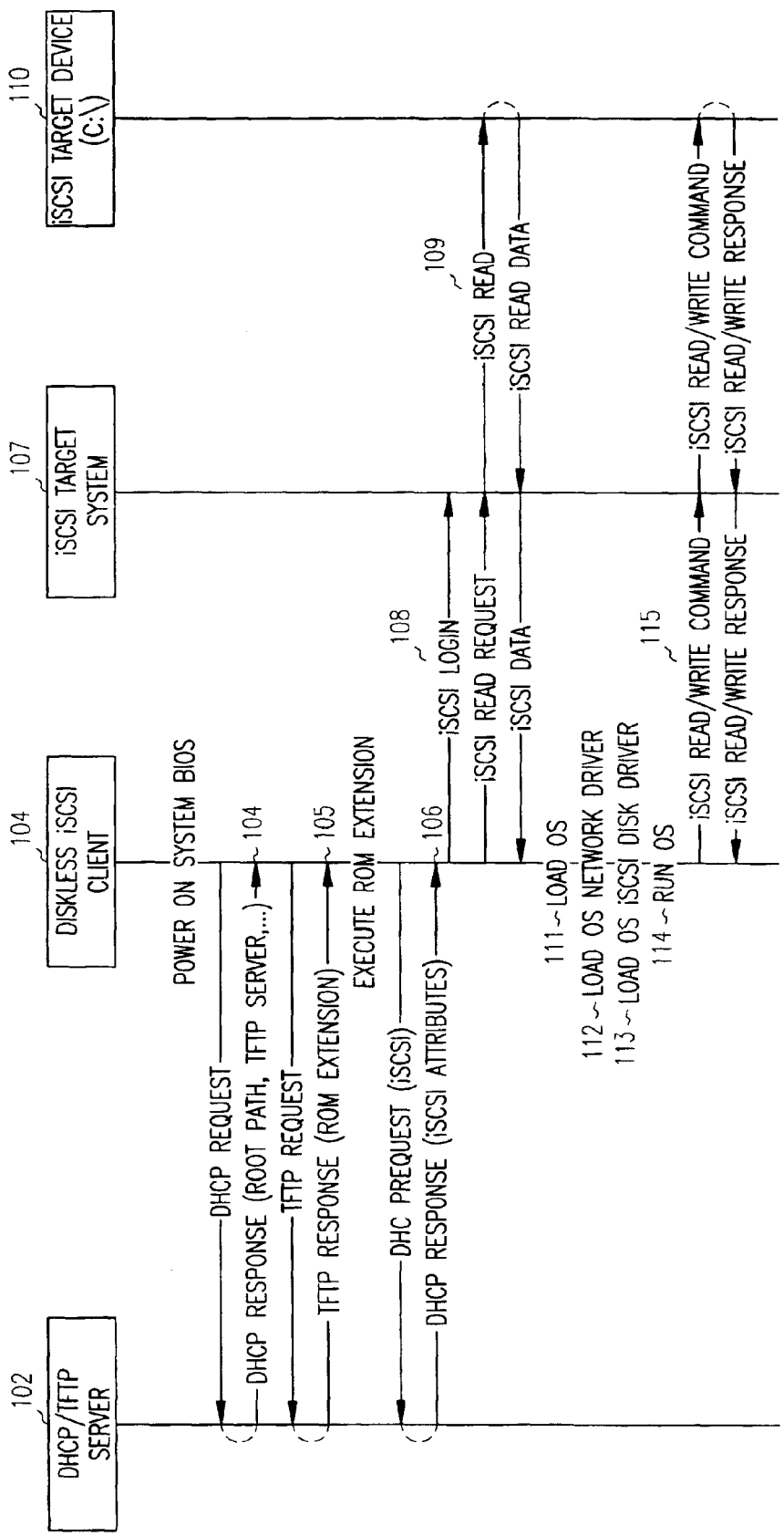
FIG. 1 shows a diagram illustrating the boot sequence of a diskless iSCSI client, consistent with an embodiment of the present invention.

FIG. 1 shows a diagram illustrating the boot sequence of a diskless iSCSI client, consistent with an embodiment of the present invention. The diskless iSCSI client example shown here is but one example of a system incorporating a computerized device that can boot using the method of the present invention In this example, the diskless iSCSI client 101 requests boot information from DHCP server 102 at 103, and receives a response at 104. The DHCP server returns information including the client's IP address and default router at 104, the TFTP server and filename of the ROM extension to be loaded at 105, and iSCSI attributes such as the iSCSI device IP address and logical unit number (LUN) at 106. The diskless client further uses its built-in TFTP to download the ROM extension from a TFTP server at 105, which in this example is also server 102.

With this information loaded in the diskless client 101, the ROM extension downloaded from the TFTP server is executed and intercepts INT13 disk operations from the diskless client's BIOS, turning them into iSCSI calls through a micro-iSCSI stack loaded as part of the ROM extensions. Universal Network Device Interface (UNDI) drivers in the client's BIOS facilitate communication with the network adapter, which provide the network interface for the iSCSI network communications.

The diskless iSCSI client 101 then logs in to the remote device 107 providing a network interface to the intended boot device 110 at 108, and loads the operating system, drivers, and other related data at 109. Here, the client also loads a second iSCSI driver that is operating system-specific, which will replace the iSCSI driver loaded earlier.

Once the operating system is loaded at 111, the BIOS starts the operating system which begins to load operating system-specific drivers from the target disk drive 110 via the first or micro-iSCSI driver initially loaded. First, an operating system network driver is loaded at 112, and then an operating system iSCSI disk driver is loaded at 113. The network driver is loaded before the iSCSI disk driver to ensure that the iSCSI disk driver can communicate iSCSI commands via the network upon execution.

Once the network stack and operating system-specific iSCSI drivers are loaded and started, control is transferred from the micro iSCSI driver and the UNDI driver to the operating system's iSCSI and network drivers.

The operating system is then loaded and fully operational at 114, and is capable of performing iSCSI disk operations to the boot volume or other volumes via the second or operating system-specific iSCSI driver interface as shown at 115. In some embodiments of the invention, a variety of other remote SCSI devices may be accessed via the network driver and the iSCSI disk driver, including CD and DVD drives, tape drives, hard disk drives, scanners, printers or imagesetters, and other such devices.

The operating system boot sequence of the present invention is different from the normal boot sequence of Microsoft Windows (r) and many other operating systems. Because the operating system disk driver of the present invention relies upon a network driver to provide access over a network to the disk via iSCSI, the traditional boot order of operating systems such as Microsoft Windows must be changed. The present invention therefore comprises in some embodiments loading a Windows operating system network driver before the Windows operating system disk driver, so that the disk driver is immediately operable to access remote disks via iSCSI once the disk driver is loaded.

In various embodiments of the invention the operating system may be any operating system, including Microsoft Windows and UNIX, including Unix versions such as Linux, AIX, or Sun UNIX. Although the various devices shown in FIG. 1 are identified using various names, the various computerized systems and servers may take any form, including routers, networked appliances, set top boxes, telecommunications equipment, or any other form consistent with the invention as claimed in the appended claims.

As an example, the following changes are made to the original ServiceGroupOrder in the Microsoft Windows 2000 registry as shown below to cause the network driver to be loaded before the iSCSI disk driver in one embodiment of the invention:

Original ServiceGroupOrder
. . .
   System Bus Extender
   SCSI Miniport . . .
   Streams Driver
   NDIS Wrapper
   PNP_TDI
   NDIS
   TDI Modified ServiceGroupOrder
. . .
   System Bus Extender
   NDIS Wrapper
   NDIS
   PNP_TDI
   SCSI Miniport
. . .
   Streams Driver
   TDI
. . .

The TCPIP (PNP_TDI group) is changed from a start type of 1 (System Start) to the early start type of 0 (Boot Start).

The NIC card drivers (NDIS group) are changed from a start type of 3 (auto or demand start) to an earlier start type of 0.

The dmload disk manager service (System Bus Extender group) is changed from a start type of 0 to the later start type of 1. This is changed so that dynamic disks work properly on iSCSI.

Figure 2:
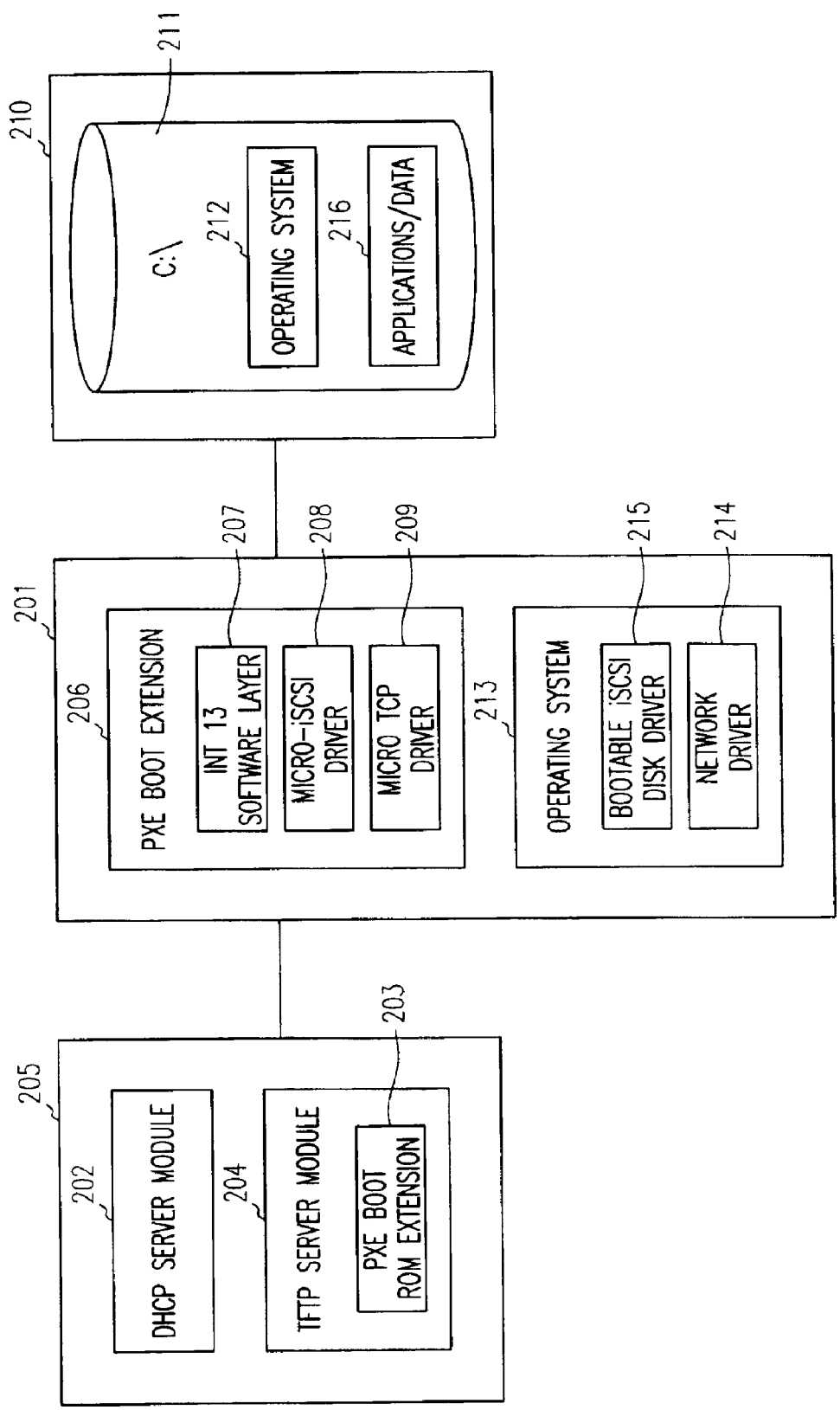
FIG. 2 shows a diagram illustrating a computerized system configuration consistent with an embodiment of the present invention.

FIG. 2 shows a diagram illustrating a computerized system configuration consistent with an embodiment of the present invention, and explains in greater detail the operation of one embodiment of the invention.

A computerized networked device 201 comprises a system BIOS (Basic Input/Output System) that uses a built-in UNDI (Universal Network Device Interface) driver operating in its PXE (Pre-boot eXecution Environment) to request boot information from a DHCP server 202. The DHCP server returns the boot information to the computerized networked device 201, including device 201's IP address and default router, TFTP server and PXE boot ROM extension filename and server, and the target iSCSI boot device's device IP address, target name, and LNU (Logical Unit Number).

The device 201 then uses its built-in TFTP extension to download the appropriate PXE boot ROM extension 203 from the TFTP server 204 identified by the DHCP server 202. In this example, the DHCP server module 202 and the TFTP server module 204 exist within the same computerized networked device 205, but in other embodiments will exist in different networked computerized devices.

The downloaded PXE boot extension 206 comprises an INT13 software layer 207 that is operable to intercept INT13 calls and convert them to iSCSI read and write commands, and to use the micro-iSCSI driver and micro TCP driver 209 to send the iSCSI commands to computerized network device 211 which contains the boot volume 211. The device 201 loads the operating system 212 from the boot volume 211 and begins the boot sequence at 213, and loads an operating system network driver 214 before loading a bootable iSCSI driver 215 specific to the operating system. After the operating system loads the operating system-specific network driver and disk driver in order, the bootable iSCSI driver 215 detects that the operating system drivers are ready, closes its TCP connections made through the micro-iSCSI driver, and switches over to use the normal iSCSI path operating through the operating system-specific network and bootable iSCSI drivers 214 and 215.

The method and systems described here do not require special hardware to operate and require only standard protocols including DHCP, TFTP and iSCSI. Two pieces of specialized software are provided in the embodiments described here to enable operation, which are the PXE boot ROM extension and the bootable iSCSI driver loaded in the booting operating system after loading the network driver.

The bootable iSCSI driver 215 is in the embodiment of the invention shown in FIG. 2 distinct from a traditional iSCSI driver in its structure, which includes modules providing specific functions. A multiplexing layer receives SCSI commands from a SCSI port driver, and determines how to route the received command. If the operating system network and disk drivers are loaded and enabled, the normal iSCSI path using the operating system network drivers is used. If the operating system network drivers are not loaded and enabled but the PXE UNDI or other network drivers are available, the micro-iSCSI driver is used along with the micro-TCP driver. If neither driver is yet loaded, the request is rejected.

The normal iSCSI path is also provided in this example embodiment via the bootable iSCSI driver, and handles all iSCSI requests once the operating system network driver is active and enabled. The micro-iSCSI path is used only when the operating system network drivers are not yet loaded and enabled, and is used between the time when the operating system is first executed and when the operating system network and disk drivers are loaded and enabled. It uses the micro-iSCSI 208 and micro-TCP 209 drivers from the PXE boot ROM extension 209 to allow the operating system to access the boot volume 211 and other ISCSI volumes before the normal operating system network services are available.

Once booted, the networked device 201 will be operable via the normal iSCSI channel to access the volume 211, including applications and data at 216. The device 201 will also be able to access other volumes and other SCSI devices via iSCSI just as a traditional computerized system may access more than one directly attached SCSI device, so that it may access applications and other data from volumes other than boot volume 211 and may operate other remotely attached SCSI devices. It is desired in this embodiment of the invention that each networked device 201 have its own boot volume 211, just as each traditional computer has its own boot volume, so that configuration, registry, swap, and other files and configuration settings unique to each computer are not overwritten by other computerized systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of booting a networked computerized system comprising:
    transporting SCSI commands over a TCP/IP connection to provide access to a bootable operating system stored on a second networked computerized system; and
    booting the networked computerized system from the bootable operating system stored on the second networked computerized system via the SCSI commands transported over the TCP/IP connection, the booting comprising loading an operating system network driver before loading an operating system disk driver.

2. The method of claim 1, wherein the bootable operating system is booted via SCSI commands transported over TCP using a TCP stack and SCSI driver loaded from a PXE boot extension.

3. The method of claim 2, wherein the PXE boot extension comprises a ROM extension loaded from a network attached server via PXE.

4. The method of claim 1, wherein the disk driver is an iSCSI driver loaded within the booting operating system.

5. The method of claim 1, wherein the operating system is Microsoft Windows (tm).

6. The method of claim 1, wherein the operating system is LINUX.

7. A networked computerized system comprising:
    a network interface card;
    an iSCSI driver operable to transport SCSI commands over a TCP/IP connection to provide access to a bootable operating system stored on a second networked computerized system; and
    a software module operable to boot the networked computerized system from the bootable operating system stored on the second networked computerized system via the SCSI commands transported over the TCP/IP connection, wherein booting the bootable operating system comprises loading a network driver before loading a disk driver.

8. The networked computerized system of claim 7, wherein the bootable operating system is booted via SCSI commands transported over TCP using a TCP stack and SCSI driver loaded from a PXE boot extension.

9. The networked computerized system of claim 8, wherein the PXE boot extension comprises a ROM extension loaded from a network attached server via PXE.

10. The networked computerized system of claim 7, wherein the disk driver is an iSCSI driver loaded within the booting operating system.

11. The networked computerized system of claim 7, wherein the operating system is Microsoft Windows (tm).

12. The networked computerized system of claim 7, wherein the operating system is LINUX.

13. A method of booting a networked computerized system comprising:
    loading a Pre-boot Execution Environment (PXE) boot extension comprising:
        a software module that intercepts INT13 calls and converts them to SCSI read and write commands;
        a micro-iSCSI driver operable to send SCSI read and write commands over a TCP/IP connection; and
        a micro-TCP stack providing a TCP implementation for the micro-iSCSI driver;
    transporting SCSI commands over the TCP/IP connection to provide access to a bootable operating system stored on a second networked computerized system via the micro-iSCSI driver and micro-TCP stack;
    booting the networked computerized system from the bootable operating system stored on the second networked computerized system via the SCSI commands transported over the TCP/IP connection;
    loading a network driver before loading an iSCSI disk driver within the booting operating system; and
    transferring network interface and SCSI control of the networked computerized system from the PXE boot extension to the operating system.

14. A networked computerized system, comprising:
    a Pre-boot Execution Environment (PXE) boot extension comprising:
        a software module that intercepts INT13 calls and converts them to SCSI read and write commands;
        a micro-iSCSI driver operable to send SCSI read and write commands over a TCP/IP connection; and
        a micro-TCP stack providing a TCP implementation for the micro-iSCSI driver;
        the PXE boot extension operable to transport SCSI commands over the TCP/IP connection to provide access to a bootable operating system stored on a second networked computerized system via the micro-iSCSI driver and micro-TCP stack;
    a software module operable to boot the networked computerized system from the bootable operating system stored on the second networked computerized system via the SCSI commands transported over the TCP/IP connection, booting the networked computerized system comprising:
        loading a network driver before loading an iSCSI disk driver within the booting operating system; and
        transferring network interface and SCSI control of the networked computerized system from the PXE boot extension to the operating system.

15. A networked computerized system comprising:
    a networking means operable to provide network capability to the computerized system;
    an iSCSI means operable to transport SCSI commands via the networking means to provide access to a bootable operating system stored on a second networked computerized system; and
    a boot means operable to boot the networked computerized system from the bootable operating system stored on the second networked computerized system via the SCSI commands transported over networking means, wherein booting the bootable operating system comprises loading a network driver before loading a disk driver.

16. The networked computerized system of claim 15, wherein the bootable operating system is booted via SCSI commands transported over the networking means using a TCP stack and SCSI driver loaded from a PXE boot extension.

17. The networked computerized system of claim 16, wherein the PXE boot extension comprises a ROM extension loaded from a network attached server via PXE.

18. The networked computerized system of claim 15, wherein the disk driver is an iSCSI driver loaded within the booting operating system.

19. The networked computerized system of claim 15, wherein the operating system is Microsoft Windows (tm).

* * * * *